(12) United States Patent
Segre (10) Patent No.: US 8,631,090 B2
(45) Date of Patent: Jan. 14, 2014

(54) RESOURCE-CONSERVING TECHNIQUE FOR AS-AVAILABLE DATA DELIVERY TO A MOBILE DEVICE

(75) Inventor: Marc Segre, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/198,314

(22) Filed: Aug. 4, 2011

(65) Prior Publication Data

US 2013/0036190 A1   Feb. 7, 2013

(51) Int. Cl.
G06F 15/16  (2006.01)

(52) U.S. Cl.
USPC ......................................................... 709/217

(58) Field of Classification Search
USPC .................. 709/220, 217; 370/338, 352, 328; 455/404.1
See application file for complete search history.

(56) References Cited

U.S. PATENT DOCUMENTS

| | | | |
|---|---|---|---|
| 7,689,234 B2 | 3/2010 | Horvath et al. | |
| 7,746,864 B1 | 6/2010 | Asawa et al. | |
| 8,086,226 B2 * | 12/2011 | Lin et al. | 455/418 |
| 8,340,678 B1 * | 12/2012 | Pandey | 455/452.2 |
| 2004/0190477 A1 * | 9/2004 | Olson et al. | 370/338 |
| 2007/0060124 A1 * | 3/2007 | Kalavade | 455/433 |
| 2007/0061397 A1 * | 3/2007 | Gregorat et al. | 709/203 |
| 2007/0135146 A1 | 6/2007 | Rezaiifar et al. | |
| 2007/0140493 A1 * | 6/2007 | Kroselberg | 380/270 |
| 2007/0232258 A1 * | 10/2007 | Matsumoto et al. | 455/404.1 |
| 2008/0175251 A1 * | 7/2008 | Oouchi et al. | 370/395.31 |
| 2008/0310403 A1 * | 12/2008 | Asoh et al. | 370/352 |
| 2009/0125626 A1 * | 5/2009 | Yeoum et al. | 709/227 |
| 2010/0003955 A1 | 1/2010 | Ray et al. | |
| 2010/0099443 A1 | 4/2010 | King et al. | |
| 2010/0130238 A1 | 5/2010 | Kupsh et al. | |
| 2010/0255864 A1 * | 10/2010 | Alfano et al. | 455/466 |
| 2010/0278125 A1 | 11/2010 | Clair et al. | |
| 2010/0304765 A1 | 12/2010 | Bhatt et al. | |
| 2011/0026440 A1 * | 2/2011 | Dunn et al. | 370/259 |
| 2011/0059758 A1 | 3/2011 | Gosselin | |
| 2011/0090898 A1 * | 4/2011 | Patel et al. | 370/352 |
| 2011/0252438 A1 * | 10/2011 | Tremblay et al. | 725/9 |

(Continued)

OTHER PUBLICATIONS

Li et al.;Ttl: P2P File-Sharing Application on Mobile Phones Base on SIP; Conf. Ttl: Innovations'07. 4th International Conference on Innovations in Information, Technology; 2007; Publisher: IEEE, Piscataway, NJ; Country of Publication: USA; ISBN: 978-1-4244-1840-4; Database: INSPEC.

*Primary Examiner* — Asad Nawaz
*Assistant Examiner* — Syed S Ali
(74) *Attorney, Agent, or Firm* — Patents on Demand P.A.; Brian K. Buchheit; Scott M. Garrett (57) ABSTRACT

A method for delivering data to a mobile device can begin with determination of the need to transmit data to a client application installed upon a mobile device by a provider in response to the occurrence of a predefined event. A session initiation protocol (SIP) message encapsulating the data can then be addressed to the mobile device using a static, unique identifier of the mobile device. The static, unique identifier can be acquired during registration of the mobile device for the service and can be electronically coupled with a hardware component of the mobile device. The SIP message can be conveyed to the Internet protocol (IP) multimedia subsystem (IMS) of an IP-based mobile communications network via a dedicated communications mechanism where it can be routed based on the static, unique identifier.

13 Claims, 4 Drawing Sheets

(56) References Cited

U.S. PATENT DOCUMENTS

| | | | |
|---|---|---|---|
| 2012/0014383 A1* | 1/2012 | Geromel et al. | 370/352 |
| 2012/0225686 A1* | 9/2012 | Akhtar et al. | 455/518 |
| 2012/0270522 A1* | 10/2012 | Laudermilch et al. | 455/411 |
| 2012/0317224 A1* | 12/2012 | Caldwell et al. | 709/217 |

\* cited by examiner

RESOURCE-CONSERVING TECHNIQUE FOR AS-AVAILABLE DATA DELIVERY TO A MOBILE DEVICE

BACKGROUND

The present invention relates to the field of mobile communications and, more particularly, to client data delivery using session initiation protocol (SIP) messages addressed with the static unique identifier of a mobile device.

Figure 1:
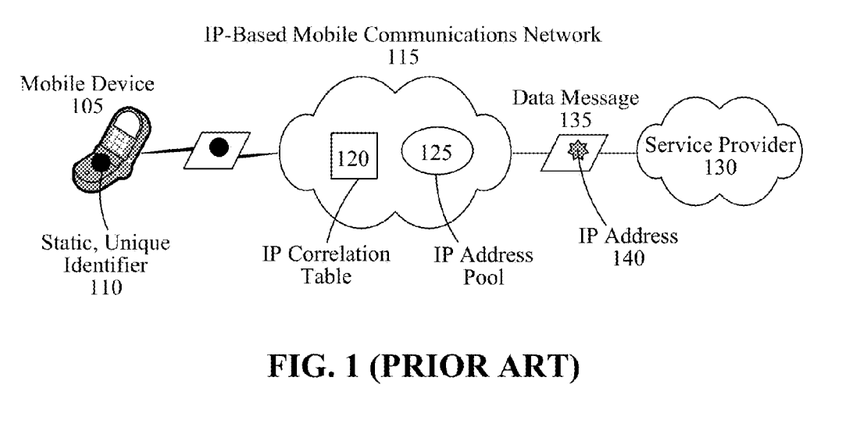
FIG. 1 (PRIOR ART) is a schematic diagram illustrating data delivery to a mobile device in a conventional IP-based mobile communications network.

The rise in popularity of mobile devices (e.g., smart phones, tablets, laptops, etc.) has correspondingly increased the quantity of available client/server software applications (e.g., email, instant messaging, games, etc.) or services for these platforms. Many of these mobile devices 105 receive their data 135 from a provider 130 over an Internet protocol (IP) based mobile communications network 115, as shown in FIG. 1. Every mobile device 105 has one or more hardware components that house one or more static, unique identifiers 110 like its mobile directory number (MDN).

For example, the subscriber identification module or SIM card of a mobile phone 105 contains within its memory an internationally-unique identifier (IMSI) for the subscriber. An electronic serial number of the mobile device 105 may be stored in its permanent memory.

The IP-based mobile communications network 115 uses the static, unique identifier 110 to communicate and track the mobile device 105 as it moves throughout the network 115. In order to interface with IP-based components, the IP-based mobile communications network 115 dynamically assigns the mobile device 105 an IP address 140 from an IP address pool 125 and records the assignment in an IP correlation table 120. The assigned IP address 140 is then used to identify data messages 135 for the mobile device 105 like those from the provider 130 as shown in FIG. 1.

The IP-based mobile communications networks 115 must then correlate the IP address 140 of a data message 135 from provider 130 to the appropriate static, unique identifier 110 to route the data message 135 to the mobile device 105. The primary issue faced by provider 130 using a conventional IP-based mobile communications network 115 is the dynamic nature of the IP address 140 with respect to the mobile device 105.

That is, the IP address 140 of the mobile device 105 is prone to change as the mobile device 105 changes its physical location and/or connection to the IP-based mobile communications network 115. In order for provider 130 to be capable of providing data to the mobile device 105 as it becomes available, the provider 130 must keep track of the IP address 140 of the mobile device 105. This incurs additional overhead on the part of the provider 130 and may result in delivery problems.

Most IP-based mobile communications network 115 use a predefined time period that a data channel is allowed to be inactive before the channel is terminated. Since it is unknown when the provider 130 will be sending data messages 135 to the mobile device 105, the provider 130 must force the IP-based mobile communications network 115 to keep the data channel active (i.e., sending a "filler" message to the mobile device 105 at regular intervals). Unfortunately, this approach increases resource consumption by the mobile device 105, greatly reducing battery life.

BRIEF SUMMARY

One aspect of the present invention can include a method for delivering data to a mobile device. In response to the occurrence of a predefined event, the need to transmit data to a client application installed upon a mobile device can be determined by a provider. The provider can utilize a client/server architecture, such as an enterprise's architecture. The mobile device can be registered to receive the data as a service of the provider. A session initiation protocol (SIP) message encapsulating the data can then be addressed by the provider to the mobile device using a static, unique identifier of the mobile device. The static, unique identifier can be acquired during registration of the mobile device for the service and can be electronically coupled with a hardware component of the mobile device. The provider can convey the SIP message to the Internet protocol (IP) multimedia subsystem (IMS) of an IP-based mobile communications network via a dedicated communications mechanism. The SIP message can be routed to the mobile device by the IP-based mobile communications network based on the static, unique identifier, such that correlations between an IP address dynamically assigned to the mobile device by the IP-based mobile communications network and the static, unique identifier of the mobile device are unnecessary to route the SIP message. The IP-based mobile communications network can dynamically establish a data channel to transmit the data of the SIP message to the mobile device and can terminate the data channel once transmission of the data is complete, minimizing resource consumption by the mobile device.

Another aspect of the present invention can include a system for delivering data to a mobile device. Such a system can include an IP-based mobile communications network, a mobile device, and a provider comprised of an application server, a client application, a subscriber ID table, and an address handler. The IP-based mobile communications network can have an Internet protocol (IP) multimedia subsystem (IMS) configured to manage data channels for transmitting data between interconnected nodes. The mobile device can be configured to send and receive data using the IP-based mobile communications network. The mobile device can have at least one static, unique identifier electronically coupled to a hardware component. The provider can have a client/server architecture and can be configured to provide data as a service to the mobile device over the IP-based mobile communications network. The application server can host a software application representing the service of the provider. The client application can be installed upon the mobile device and can interact with the software application running on the application server. The subscriber ID table can contain the static, unique identifier for the mobile device correlated to at least one secondary identifier of the mobile device. The secondary identifier can be subject to change. The address handler can be configured to address session initiation protocol (SIP) messages encapsulating data for delivery to the mobile device using the at least one static, unique identifier contained in the subscriber ID table. The SIP messages can be sent from the provider to the IMS of the IP-based mobile communications network using a dedicated communications mechanism. Correlations between an IP address dynamically assigned to the mobile device by the IP-based mobile communications network and the at least one static, unique identifier of the mobile device can be unnecessary to route the SIP messages.

Yet another aspect of the present invention can include a computer program product that includes a computer readable storage medium having embedded computer usable program code. The computer usable program code can be configured to intercept an electronic message from a service of a provider addressed to a mobile device using an Internet protocol (IP) address. The IP address can be dynamically assigned to the mobile device by an IP-based mobile communications network. Data contained in the electronic message can be for use by a client application associated with the service that is installed upon the mobile device. The computer usable program code can be configured to correlate the IP address of the electronic message to a static, unique identifier of the mobile device using data contained in a subscriber ID table. The static, unique identifier can be electronically coupled to a hardware component of the mobile device. The computer usable program code can be configured to replace the IP address of the intercepted electronic message with the correlated static, unique identifier. Further, the computer usable program code can be configured to convey the electronic message to an IP multimedia subsystem (IMS) of the IP-based mobile communications network using a dedicated communications mechanism. The IMS can route the electronic message to the mobile device based on the static, unique identifier.

DETAILED DESCRIPTION

The present invention discloses a solution for a resource-conserving technique for delivering data to a mobile device. A provider can utilize a dedicated communications mechanism to send session initiation protocol (SIP) messages addressed using a static, unique identifier for the target mobile device to the IMS of an IP-based mobile communications network. For example, in one embodiment, the provider can represent an enterprise providing business applications to a set of employees. The IP-based mobile communications network, utilizing its inherent functionality, can dynamically establish a data channel with the mobile device to convey the SIP message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
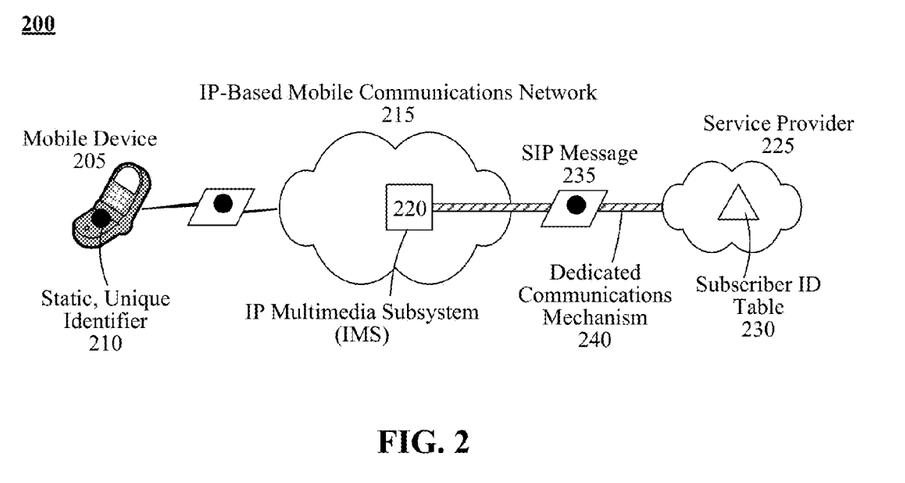
FIG. 2 is a logical diagram illustrating a system that utilizes a resource-conserving technique for as-available data delivery to a mobile device in accordance with an embodiment of the inventive arrangements disclosed herein.

FIG. 2 is a logical diagram illustrating a system 200 that utilizes a resource-conserving technique for as-available data delivery to a mobile device 205 in accordance with embodiments of the inventive arrangements disclosed herein. In system 200, the provider 225 can be configured to provide a mobile device 205 with data in an "as-available" fashion using session initiation protocol (SIP) messages 235 addressed with the static, unique identifier 210 of the mobile device 205, instead of an IP address, as shown in FIG. 1.

As used herein, the term "as-available" is used to refer to the provision of data to a subscriber or mobile device 205 as the data becomes available for use or delivery. For example, a user may subscribe to a service that sends them an email containing stock market data when the value of one of their holdings changes. Thus, the email can be available for delivery to the user once a holding value change occurs.

"As-available" should not, however, be confused with "on-demand". "On-demand" data delivery can require the data to always be available for delivery when the user demands. "As-available" can be considered as a more typical subscription delivery model where a user requests data that is not yet available (e.g., updates, future news stories, etc.).

Instead of tracking the IP address of the mobile device 205, the provider 225 can be configured to record the static, unique identifier 210 of the mobile device 205 in a subscriber ID table 230. The subscriber ID table 230 can also correlate the static, unique identifier 210 with additional or secondary identifiers used by the provider 225 to reference the mobile device 205, such as a username or email address.

It is important to emphasize that the static, unique identifier 210 of the mobile device 205 does not change like a user's choice of username or the IP address assigned by the IP-based mobile communications network 215. Therefore, the static, unique identifier 210 can always point to the same mobile device 205, regardless of changes in the device's 205 assigned IP address or a name assigned by the user.

The provider 225 can obtain the static, unique identifier 210 of the mobile device 205 during a registration process. For example, when a user utilizes the mobile device 205 to register for the desired service from the provider 225 provider 225, the provider 225 can request the static, unique identifier 210 from either the appropriate component of the IP-based mobile communications network 215 or the mobile device 205.

At subsequent points in time, the provider 225 can need to send data to the mobile device 205 as part of the registered service. For example, the user may have registered to receive news updates. Therefore, when a news update becomes available, the provider 225 would send the news update to the mobile device 205.

The provider 225 can be configured to utilize a dedicated communications mechanism 240 to convey the data in a SIP message 235 to the IP multimedia subsystem (IMS) 220 of the IP-based mobile communications network 215. The dedicated communications mechanism 240 can represent an established means of communication between the provider 225 and the IMS 240 like a virtual private network (VPN). Thus, the provider 225 and IMS 240 can be considered as "known" by each other.

Further, the IMS 240 can already handle SIP messages 235 and the static, unique identifier 210 of the mobile device 205. By using the IMS 240 to route the SIP message 235 from the provider 225 through the IP-based mobile communications network 215 to the mobile device 205, the provider 225 can avoid having to keep a data channel with the mobile device 205 active.

The IP-based mobile communications network 215 can already keep track of the location of the mobile device 205 in order to establish communication. Therefore, this inherent function of the IP-based mobile communications network 215 can be used by the provider 225 via the dedicated communications mechanism 240 and IMS 240 to send data as it becomes available to the mobile device 205 in a SIP message 235.

Because the data channel to the mobile device 205 is established only when data is sent (instead of being kept active by the provider 225), the resources of the mobile device 205 can be conserved (i.e., less time with an active data channel means the mobile device 205 expends less battery power).

The IP-based mobile communications network 215 can include any hardware/software/and firmware necessary to convey data encoded within carrier waves. Data can be contained within analog or digital signals and conveyed though data or voice channels. IP-based mobile communications network 215 can include local components and data pathways necessary for communications to be exchanged among computing device components and between integrated device components and peripheral devices. IP-based mobile communications network 215 can also include network equipment, such as routers, data lines, hubs, and intermediary servers which together form a data network, such as the Internet. IP-based mobile communications network 215 can also include circuit-based communication components and mobile communication components, such as telephony switches, modems, cellular communication towers, and the like. IP-based mobile communications network 215 can include line based and/or wireless communication pathways.

Figure 3:
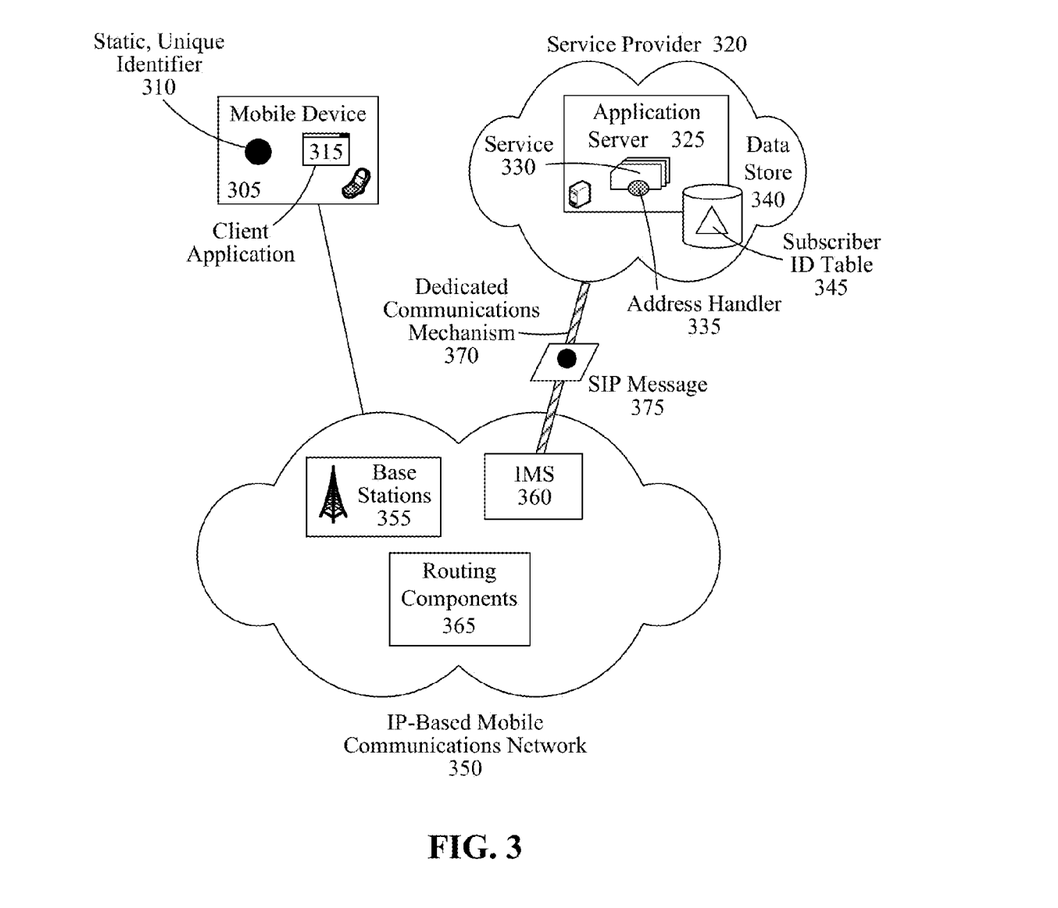
FIG. 3 is a schematic diagram of a system implementing a resource-conserving technique for as-available data delivery to a mobile device in accordance with an embodiment of the inventive arrangements disclosed herein.

FIG. 3 is a schematic diagram of a system 300 implementing a resource-conserving technique for as-available data delivery to a mobile device 305 in accordance with embodiments of the inventive arrangements disclosed herein. System 300 can represent an embodiment of system 200.

In system 300, the mobile device 305 can represent a variety of portable electronic devices capable of utilizing an IP-based mobile communications network 350 to receive data from a provider 320. Examples of a mobile device 305 can include, but are not limited to, a mobile phone, a smart phone, a laptop computer, a personal data assistant (PDA), a notebook computer, a portable game console, and the like. The provider 305 can represent any entity able to provide information/services/applications to any client, such as mobile device 305. For example, in one embodiment, the provider 305 can represent an enterprise providing business applications to their employees.

The mobile device 305 can have a static, unique identifier 310 stored in local memory, such as a mobile directory number (MDN), mobile identification number (MIN), and/or electronic serial number. The static, unique identifier 310 can be used by the IP-based mobile communications network 350 to conduct data exchanges.

The IP-based mobile communications network 350 can represent the hardware, software, and/or firmware necessary to convey data encoded within carrier waves. The specific components utilized by the IP-based mobile communications network 350 can vary based on the type of technology used (e.g., LTE or WiMAX). As such, only the general functional components necessary for this embodiment of the present disclosure have been illustrated in system 300.

Data can be contained within analog or digital signals and conveyed though data or voice channels of the IP-based mobile communications network 350. The IP-based mobile communications network 350 can include local components and data pathways necessary for communications to be exchanged among computing device components and between integrated device components and peripheral devices. The IP-based mobile communications network 350 can also include network equipment, such as routers, data lines, hubs, and intermediary servers which together form a data network, such as the Internet.

As shown in system 300, the IP-based mobile communications network 350 can include base stations 355, an IMS 360, and routing components 365. The base stations 355 can represent the outer nodes of the IP-based mobile communications network 350 by which the mobile device 305 connects to the network 350.

The IMS 360 can be the component configured to provide multimedia services through the IP-based mobile communications network 350. The functionality of an IMS 360 is well known by those skilled in the art, and, as such, will not be discussed in detail herein.

The routing components 365 can correspond to those components of the IP-based mobile communications network 350 used in the routing of data to the mobile device 305. For example, routing components 365 can include components that track the location of the mobile device 305 within the coverage area of the IP-based mobile communications network 350 in order to determine which base station 355 should be used for communication.

It should be noted that this resource-conserving technique need not alter the architecture and/or configuration of an existing IP-based mobile communications network 350. That is, this technique can be utilized in conjunction with existing IP-based mobile communications network 350 architectures that support the components shown in system 300.

Provider 320 can use the IP-based mobile communications network 350 to provide data to the mobile device 305 in an "as-available" manner. The provider 320 can represent the hardware and/or software components that perform functions that provide the mobile device 305 with the requested data using a client/server architecture.

These hardware/software components can include a dedicated communications mechanism 370, an application server 325 hosting one or more services 330, a client application 315, and a data store 340 housing a subscriber ID table 345. As previously discussed, the dedicated communications mechanism 370 can represent an established communications medium between the provider 320 and the IMS 360 of the IP-based mobile communications network 350.

The application server 325 can represent a configuration of hardware and/or software components that support operation of one or more services 330. A service 330 can be a software application configured to perform a specific function and send data to the client application 315. In this embodiment of the present disclosure, each service 330 can include an address handler 335.

The address handler 335 can represent software code used by the service 330 when sending data to the mobile device 305. The address handler 335 can be configured to address a session initiation protocol (SIP) message 375 containing the data with the static, unique identifier 310 for the mobile device 305 stored in the subscriber ID table 345.

In the present embodiment shown in system 300, the address handler 335 can be implemented as a reusable function that can be invoked within the code of each service 330.

In another contemplated embodiment, the address handler 335 can be implemented as a middleware element, separate to the services 330. In such an embodiment, the service 330 can continue to address messages to the mobile device 305 using an IP address. The address handler 335 would then intercept and change the destination from the IP address to the static, unique identifier 310. Further, the address handler 335 would be able to repackage data messages of other types as SIP messages 375 addressed with the static, unique identifier 310.

The client application 315 can be a software application installed upon the mobile device 305 that is configured to handle data received from the provider 320. The client application 315 can be used to provide the provider 320 with the static, unique identifier 310 of the mobile device 305.

For example, when the user installs the client application 315 and registers with the provider 320, the client application 315 can interrogate the mobile device 305 for the static, unique identifier 310 and convey the static, unique identifier 310 to the provider 320.

The corresponding service 330 would then record the static, unique identifier 310 in the subscriber ID table 345 along with any other identifiers specified by the user (e.g., username, email address) or generated internal to the service 330 and/or provider 320 (e.g., userID, SIP URI).

As used herein, presented data store 340 can be a physical or virtual storage space configured to store digital information. Data store 340 can be physically implemented within any type of hardware including, but not limited to, a magnetic disk, an optical disk, a semiconductor memory, a digitally encoded plastic memory, a holographic memory, or any other recording medium. Data store 340 can be a stand-alone storage unit as well as a storage unit formed from a plurality of physical devices. Additionally, information can be stored within data store 340 in a variety of manners. For example, information can be stored within a database structure or can be stored within one or more files of a file storage system, where each file may or may not be indexed for information searching purposes. Further, data store 340 can utilize one or more encryption mechanisms to protect stored information from unauthorized access.

Figure 4:
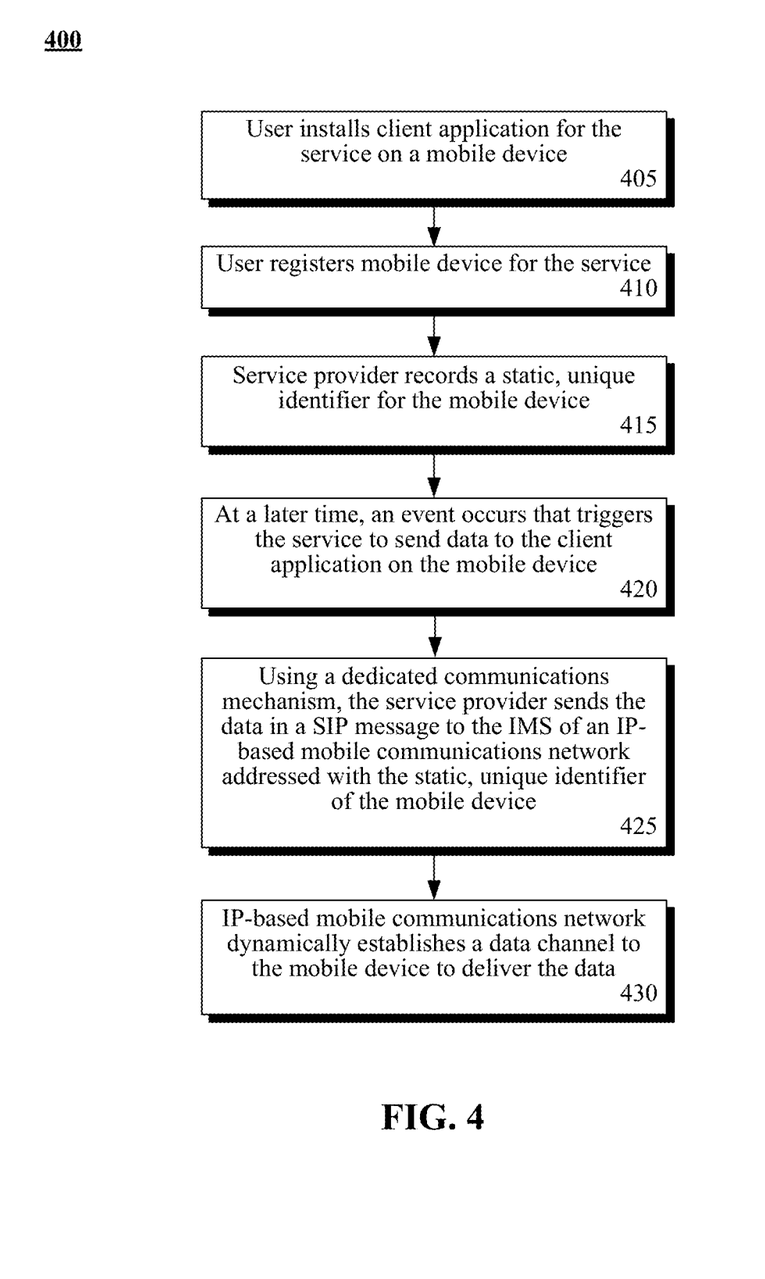
FIG. 4 is a flow chart of a method describing the basic actions performed using the resource-conserving technique for "as-available" data delivery to a mobile device in accordance with embodiments of the inventive arrangements disclosed herein.

FIG. 4 is a flow chart of a method 400 describing the basic actions performed using the resource-conserving technique for "as-available" data delivery to a mobile device in accordance with embodiments of the inventive arrangements disclosed herein. Method 400 can be performed within the context of systems 200 and/or 300.

Method 400 can begin in step 405 where the user can install the client application for the service of the provider on the mobile device. The user can then register the mobile device with the service in step 410.

In step 415, the provider can record the static, unique identifier of the mobile device. The static, unique identifier can be recorded in the subscriber ID table. The provider can obtain the static, unique identifier from the client application or in response to a request to the appropriate component of the IP-based mobile communications network.

At a later point in time, an event can occur that triggers the service to send data to the client application of the mobile device in step 420. In step 425, the provider can send the data to the IMS of the IP-based mobile communications network using a dedicated communications mechanism. The data can be sent in a SIP message addressed using the static, unique identifier the mobile device.

The IP-based mobile communications network can then dynamically establish a data channel to the mobile device based on the static, unique identifier and deliver the SIP message to the client application.

Figure 5:
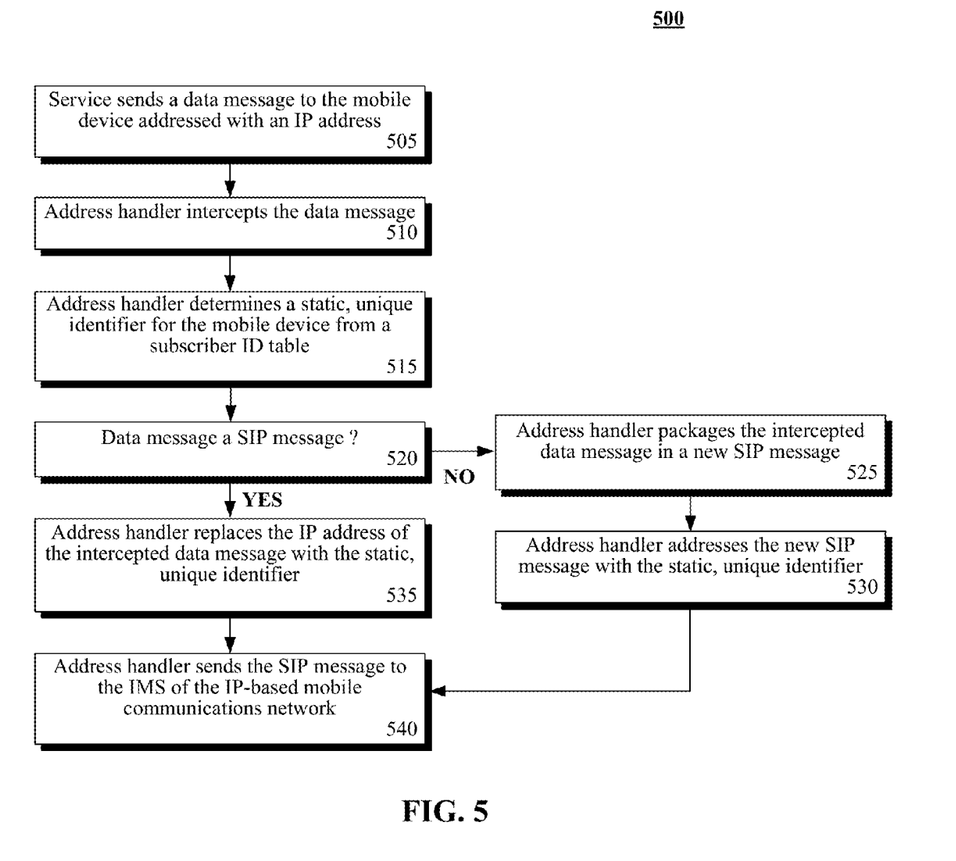
FIG. 5 is a flow chart of a method detailing the handling of SIP message addressing by a middleware implementation of the address handler in accordance with embodiments of the inventive arrangements disclosed herein.

FIG. 5 is a flow chart of a method 500 detailing the handling of SIP message addressing by a middleware implementation of the address handler in accordance with embodiments of the inventive arrangements disclosed herein. Method 500 can be performed within the context of systems 200 and/or 300, and/or in conjunction with method 400.

Method 500 can begin in step 505 where the service can send a data message to the mobile device that is addressed with the IP address of the mobile device. The address handler can intercept the message sent by the service in step 510.

In step 515, the address handler can determine the static, unique identifier for the mobile device from the subscriber ID table. This correlation can be based upon the IP address of mobile device or any other secondary identifiers for the mobile device included with the data message.

It can be determined if the intercepted data message is a SIP message in step 520. When the intercepted data message is not a SIP message, step 525 can execute where the address handler can package the intercepted message in a new SIP message. The new SIP message can then be addressed with the static, unique identifier by the address handler in step 530.

When the intercepted data message is a SIP message, step 535 can execute where the address handler can replace the IP address of the intercepted data message with the static, unique identifier. Upon completion of step 530 or step 535, the address handler can then send the SIP message to the IMS of the IP-based mobile communications network in step 540.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for delivering data to a mobile device comprising:
    in response to an occurrence of a predefined event, determining of a need to transmit data to an associated client application installed upon a mobile device in at least one of real-time and near real-time by a provider, wherein the provider utilizes a client/server architecture, and, wherein said mobile device is registered to receive said data as a service of the provider;
    during a registration process for the service, recording of a plurality of user data comprising at least one static, unique identifier of the mobile device and comprising notification preferences for receiving said data in a data table by the provider, wherein the static, unique identifier comprises at least one of a mobile directory number (MDN), a mobile identification number (MIN), and an electronic serial number (ESN);
    addressing of a session initiation protocol (SIP) message encapsulating the data to the mobile device using the at least one static, unique identifier of the mobile device by the provider, wherein said at least one static, unique identifier is acquired during registration of the mobile device for the service and is electronically coupled with at least one hardware component of the mobile device; and
    conveying of the SIP message to an Internet protocol (IP) multimedia subsystem (IMS) of an IP-based mobile communications network by the provider via a dedicated communications mechanism, wherein the SIP message is routed to the mobile device by the IP-based mobile communications network based on the at least one static, unique identifier, wherein correlations between an IP address dynamically assigned to the mobile device by the IP-based mobile communications network and the at least one static, unique identifier of the mobile device are unnecessary to route the SIP message, and, wherein the IP-based mobile communications network dynamically establishes a data channel to transmit the data of the SIP message to the mobile device, and wherein the IP-based mobile communication network terminates the data channel once transmission of the data is complete, wherein resource consumption by the mobile device to receive said data in an as-available manner is minimized.

2. The method of claim 1, wherein the data provided by the service comprises at least one of audio data, video data, image data, and textual data.

3. The method of claim 1, further comprising:
    interrogating the at least one hardware component of the mobile device to obtain the at least one static, unique identifier.

4. The method of claim 1, wherein the dedicated communications mechanism utilizes at least one of a virtual private network (VPN), a national private lease circuit (NPLC), and multiprotocol label switching (MPLS).

5. The method of claim 1, wherein the steps outlined in claim 1 are performed by a software application whose operation represents functionality provided by the service.

6. The method of claim 1, wherein determining of the need to transmit data further comprises:
    detecting the occurrence of the predefined event;
    identifying a unique internal identifier for the mobile device associated with the occurrence of the predefined event, wherein said association represents the need for the identified mobile device to receive the data for the detected predefined event, and, wherein said unique internal identifier is only for internal use by the service, wherein the unique internal identifier is subject to change; and
    correlating the unique internal identifier of the identified mobile device to the at least one static, unique identifier of the mobile device.

7. The method of claim 6, wherein the unique internal identifier comprises at least one of a username, a user identification (ID) number, a SIP universal resource identifier (URI), a TEL URI, and an email address.

8. A system comprising:
one or more processors;
a non-transitory storage medium storing program instructions, wherein the one or more processors execute the program instructions to:
in response to an occurrence of a predefined event, determine of a need to transmit data to an associated client application installed upon a mobile device in at least one of real-time and near real-time by a provider, wherein the provider utilizes a client/server architecture, and, wherein said mobile device is registered to receive said data as a service of the provider;
during a registration process for the service, record a plurality of user data comprising at least one static, unique identifier of the mobile device and comprising notification preferences for receiving said data in a data table by the provider, wherein the static, unique identifier comprises at least one of a mobile directory number (MDN), a mobile identification number (MIN), and an electronic serial number (ESN);
address of a session initiation protocol (SIP) message encapsulating the data to the mobile device using the at least one static, unique identifier of the mobile device by the provider, wherein said at least one static, unique identifier is acquired during registration of the mobile device for the service and is electronically coupled with at least one hardware component of the mobile device; and
convey of the SIP message to an Internet protocol (IP) multimedia subsystem (IMS) of an IP-based mobile communications network by the provider via a dedicated communications mechanism, wherein the SIP message is routed to the mobile device by the IP-based mobile communications network based on the at least one static, unique identifier, wherein correlations between an IP address dynamically assigned to the mobile device by the IP-based mobile communications network and the at least one static, unique identifier of the mobile device are unnecessary to route the SIP message, and, wherein the IP-based mobile communications network dynamically establishes a data channel to transmit the data of the SIP message to the mobile device, and wherein the IP-based mobile communication network terminates the data channel once transmission of the data is complete, wherein resource consumption by the mobile device to receive said data in an as-available manner is minimized.

9. The system of claim 8, wherein the data provided by the service comprises at least one of audio data, video data, image data, and textual data.

10. The system of claim 8, wherein the dedicated communications mechanism utilizes at least one of a virtual private network (VPN), a national private lease circuit (NPLC), and multiprotocol label switching (MPLS).

11. A storage device comprising:
a non-transitory storage medium storing program instructions, wherein the program instructions when executed by a processor cause a computing device to:
in response to an occurrence of a predefined event, determine of a need to transmit data to an associated client application installed upon a mobile device in at least one of real-time and near real-time by a provider, wherein the provider utilizes a client/server architecture, and, wherein said mobile device is registered to receive said data as a service of the provider;
during a registration process for the service, record a plurality of user data comprising at least one static, unique identifier of the mobile device and comprising notification preferences for receiving said data in a data table by the provider, wherein the static, unique identifier comprises at least one of a mobile directory number (MDN), a mobile identification number (MIN), and an electronic serial number (ESN);
address of a session initiation protocol (SIP) message encapsulating the data to the mobile device using the at least one static, unique identifier of the mobile device by the provider, wherein said at least one static, unique identifier is acquired during registration of the mobile device for the service and is electronically coupled with at least one hardware component of the mobile device; and
convey of the SIP message to an Internet protocol (IP) multimedia subsystem (IMS) of an IP-based mobile communications network by the provider via a dedicated communications mechanism, wherein the SIP message is routed to the mobile device by the IP-based mobile communications network based on the at least one static, unique identifier, wherein correlations between an IP address dynamically assigned to the mobile device by the IP-based mobile communications network and the at least one static, unique identifier of the mobile device are unnecessary to route the SIP message, and, wherein the IP-based mobile communications network dynamically establishes a data channel to transmit the data of the SIP message to the mobile device, and wherein the IP-based mobile communication network terminates the data channel once transmission of the data is complete, wherein resource consumption by the mobile device to receive said data in an as-available manner is minimized.

12. The storage device of claim 11, wherein the data provided by the service comprises at least one of audio data, video data, image data, and textual data.

13. The storage device of claim 11, wherein the dedicated communications mechanism utilizes at least one of a virtual private network (VPN), a national private lease circuit (NPLC), and multiprotocol label switching (MPLS).

* * * * *